United States Patent
Carnevali

(10) Patent No.: US 8,366,469 B2
(45) Date of Patent: Feb. 5, 2013

(54) CONNECTOR ISOLATOR SYSTEM

(76) Inventor: Jeffrey D. Carnevali, Seattle, WA (US)

( * ) Notice: Subject to any disclaimer, the term of this patent is extended or adjusted under 35 U.S.C. 154(b) by 0 days.

(21) Appl. No.: 13/222,997

(22) Filed: Aug. 31, 2011

(65) Prior Publication Data

US 2012/0045932 A1    Feb. 23, 2012

Related U.S. Application Data

(63) Continuation-in-part of application No. 12/806,721, filed on Aug. 18, 2010.

(51) Int. Cl.
*H01R 13/64* (2006.01)
(52) U.S. Cl. .................. 439/248; 439/384; 439/544
(58) Field of Classification Search .................. 439/247, 439/248, 382, 384, 544
See application file for complete search history.

(56) References Cited

U.S. PATENT DOCUMENTS

| | | | | |
|---|---|---|---|---|
| 4,361,372 A | * | 11/1982 | Majkrzak et al. | 439/247 |
| 5,397,244 A | * | 3/1995 | Generoli et al. | 439/248 |
| 5,845,885 A | * | 12/1998 | Carnevali | 248/181.1 |
| 6,422,885 B2 | * | 7/2002 | Kain et al. | 439/247 |
| 6,527,572 B2 | * | 3/2003 | Jou | 439/248 |
| 7,090,521 B2 | * | 8/2006 | Nishio et al. | 439/248 |
| 7,311,541 B2 | * | 12/2007 | Chien et al. | 439/246 |
| 2002/0048982 A1 | * | 4/2002 | Gu et al. | 439/247 |
| 2006/0105603 A1 | * | 5/2006 | Nishio et al. | 439/247 |
| 2012/0045931 A1 | * | 2/2012 | Carnevali | 439/544 |
| 2012/0045932 A1 | * | 2/2012 | Carnevali | 439/552 |
| 2012/0206875 A1 | * | 8/2012 | Carnevali | 361/679.41 |

* cited by examiner

*Primary Examiner* — James Harvey
(74) *Attorney, Agent, or Firm* — Charles J. Rupnick

(57) ABSTRACT

A connector isolator system, having a mounting plate with a contact surface and an opposing operational surface and an aperture extended therebetween; a plurality of backstops spaced a distance away from the operational surface of the mounting plate; a printed circuit board (PCB) or other connector carrier member that is movable out-of-plane between the backstop and the operational surface of the mounting plate, and a plurality of in-plane isolators mounted therein with an electrical connector mounted thereon in a position to pass through the aperture in the mounting plate; and one or more biasing members arranged for urging the connector carrier member toward the mounting plate and the electrical connector through the aperture therein.

20 Claims, 8 Drawing Sheets

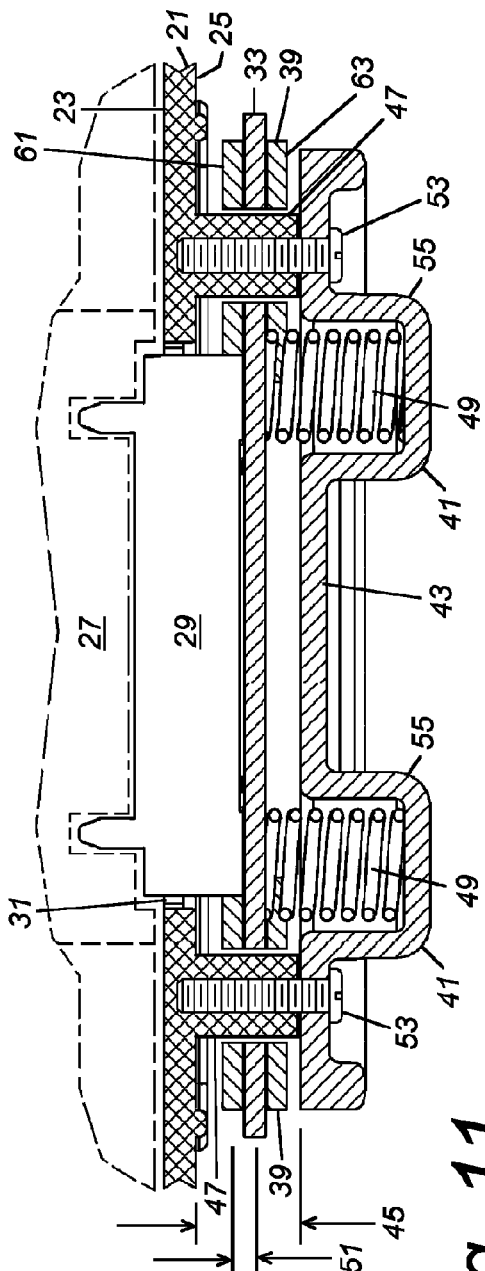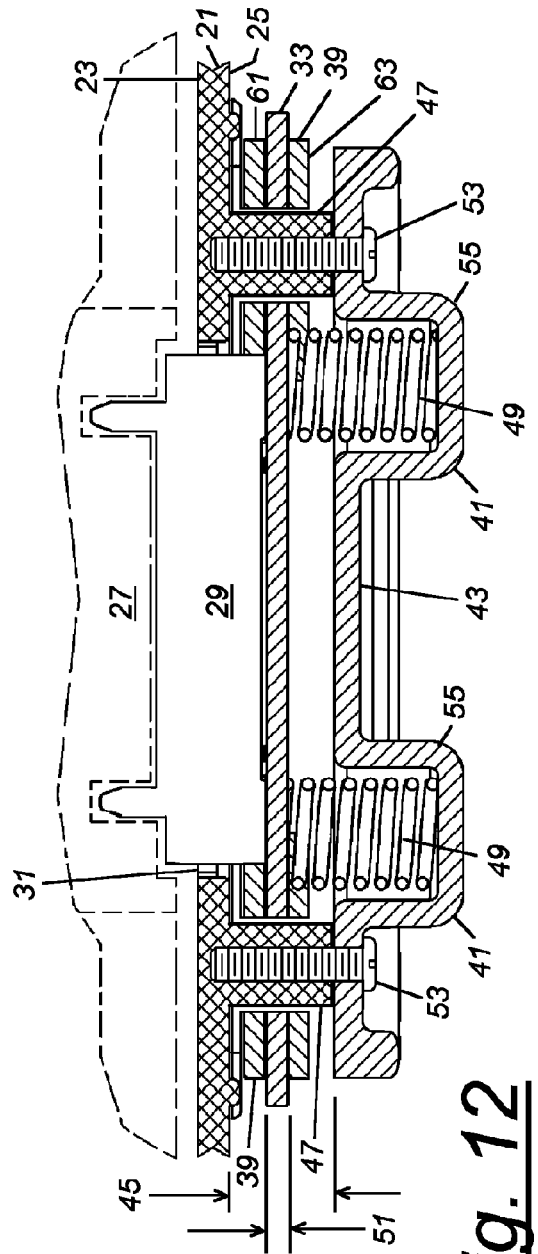

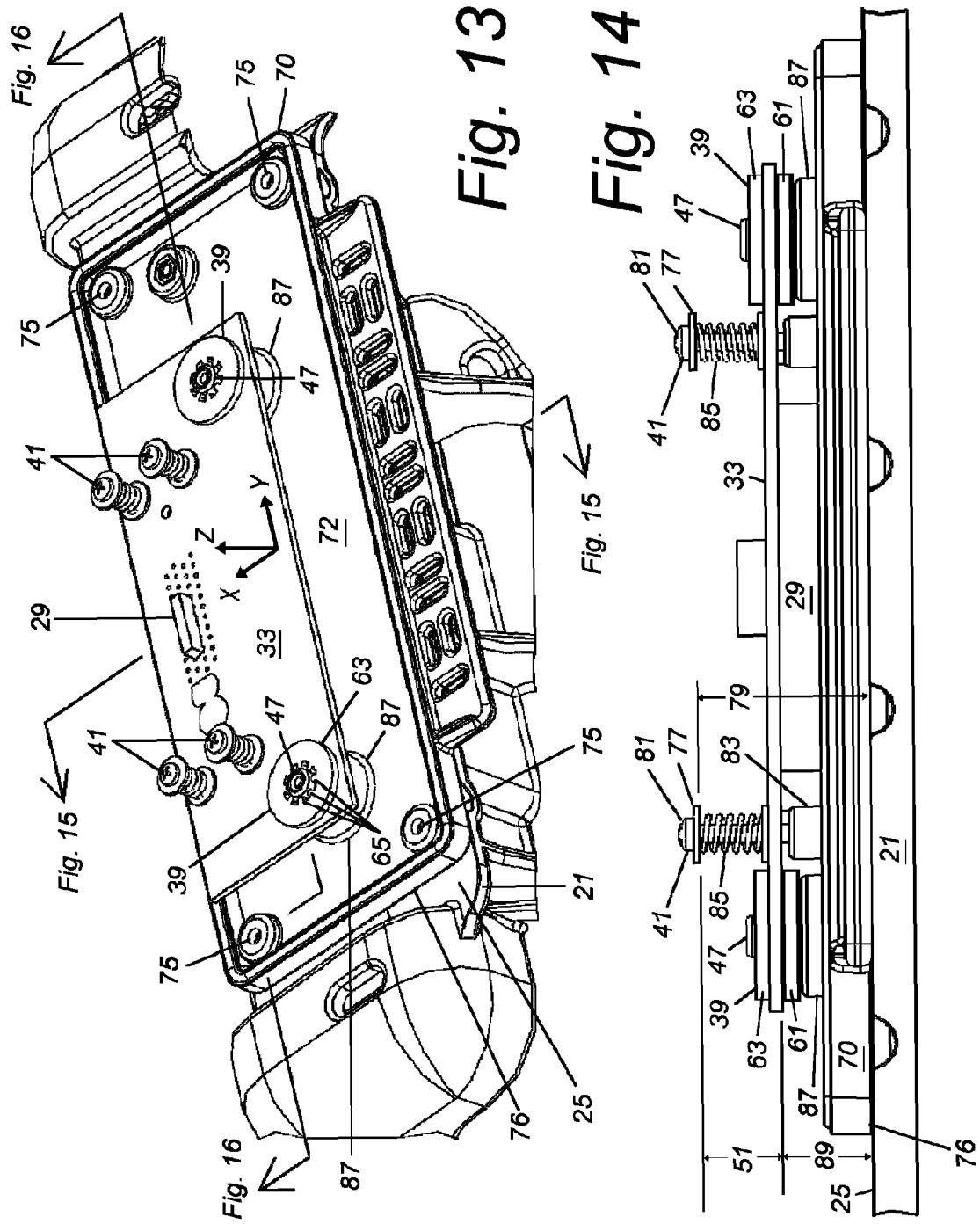

US 8,366,469 B2

CONNECTOR ISOLATOR SYSTEM

This application is a Continuation-in-part and claims priority benefit of copending parent U.S. patent application Ser. No. 12/806,721 filed in the name of Jeffrey D. Carnevali on Aug. 18, 2010, the complete disclosure of which is incorporated herein by reference.

FIELD OF THE INVENTION

The present invention relates generally to docking stations for portable computing devices, and in particular to isolators for retaining secure connection of expansion connectors of active docking stations with input/output (I/O) communication ports of portable computers and other portable computing devices seated in the docking station.

BACKGROUND OF THE INVENTION

Docking stations for portable computers and other portable computing devices are generally well-known, including active docking stations having an expansion connector connectable with an input/output (I/O) communication port of a portable computer and other portable computing device seated therein.

However, known active docking station apparatus are limited in their ability to efficiently provide secure connection between the expansion connector of the docking station apparatus and the I/O communication port of the portable computer or other portable computing device during exposure to shock and vibration environments applied along the direction of insertion of the expansion connector.

SUMMARY OF THE INVENTION

The present invention is an isolator for an expansion connector of an active docking station, where the expansion connector is connectable with an input/output (I/O) communication port of a portable computer and other portable computing device seated in the docking station.

According to one aspect of the connector isolator system, the system includes a mounting plate with a contact surface and an opposing operational surface and an aperture extended therebetween; a plurality of backstops spaced a distance away from the operational surface of the mounting plate; a printed circuit board (PCB) or other connector carrier member that is movable out-of-plane between the backstop and the operational surface of the mounting plate, and a plurality of in-plane isolators mounted therein with an electrical connector mounted thereon in a position to pass through the aperture in the mounting plate; and one or more biasing members arranged for urging the connector carrier member toward the mounting plate and the electrical connector through the aperture therein.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 11 and FIG. 12 both illustrate the connector carrier member operated in combination with two of the out-of-plane Z-axis isolators; and FIGS. 13-16 all illustrate a single alternative embodiment of the connector isolator system of the invention, wherein FIG. 13 is a top pictorial view of the alternative embodiment of the connector isolator system, FIG. 14 is a front elevation view of the alternative embodiment of the connector carrier member shown in FIG. 13, FIG. 15 is a side cross-section view thereof, and FIG. 16 is a front cross-section view thereof.

DETAILED DESCRIPTION OF PREFERRED EMBODIMENT

As required, a detailed illustrative embodiment of the present connector isolator is disclosed herein. However, techniques, systems and operating structures in accordance with the present connector isolator may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present connector isolator. The following presents a detailed description of an illustrative embodiment (as well as some alternative embodiments) of the present connector isolator.

In the Figures, like numerals indicate like elements.

Figure 1:
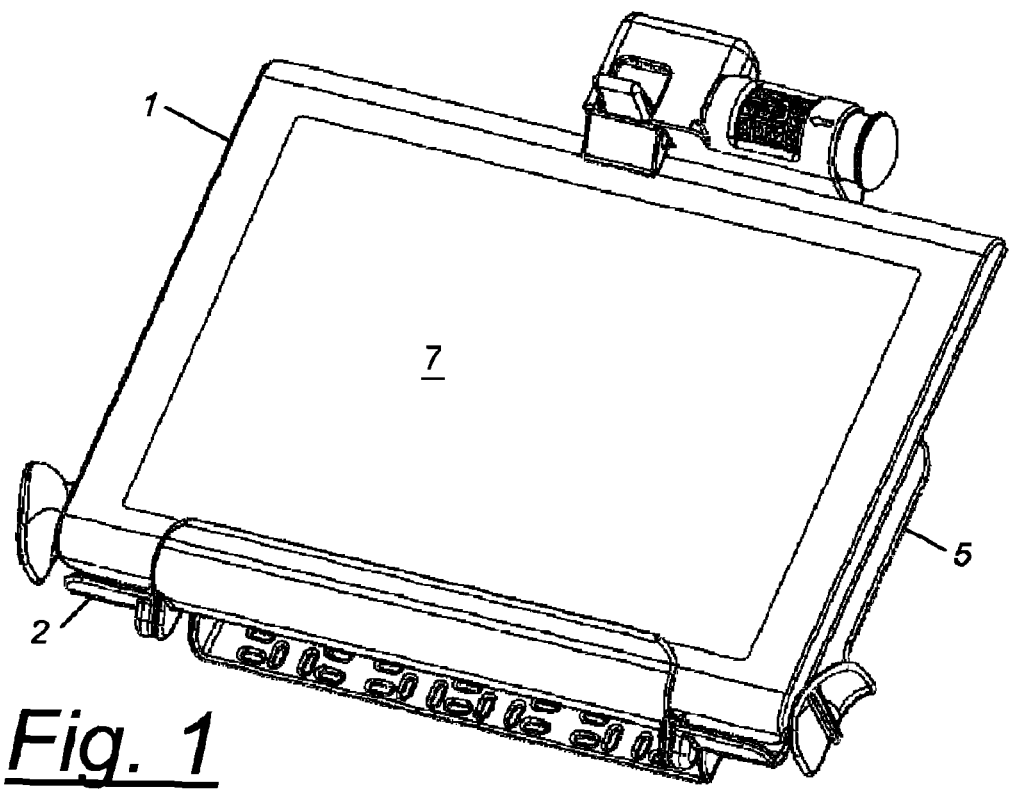
FIG. 1 shows a portable computer or other portable computing device seated in a docking tray of a docking station.

FIG. 1 shows a portable computer or other portable computing device 1 seated in a docking tray 3 of a docking station 5. Such portable computing devices 1 are generally provided with one or more connectors and ports for function expansion, usually on the rear face of its casing which supports its display unit 7. These portable computing devices 1 are furnished with additional functions by connecting peripheral devices, such as a hard disk drive, mouse, printer, etc., to the connectors and ports.

Figure 2:
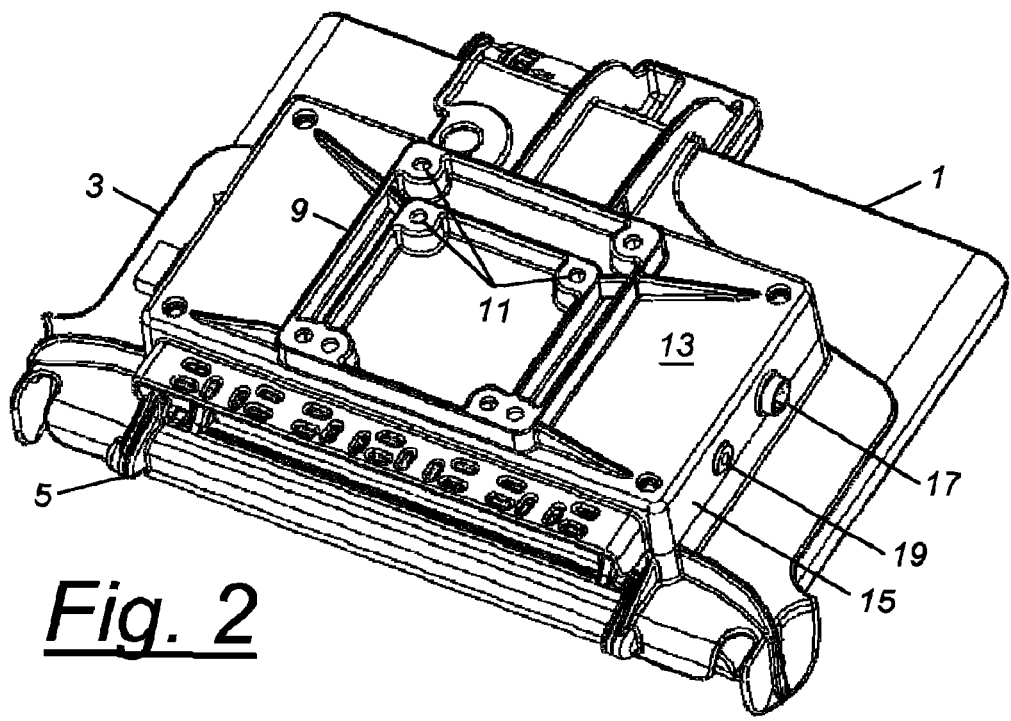
FIG. 2 shows a backside of the docking tray which includes an expansion module.

FIG. 2 shows the backside of docking tray 3 which includes a mounting structure 9 that is structured to adapt docking station 5 for mounting to an external support structure, by example and without limitation, a universally positionable device invented by the inventor of the present invention as disclosed in U.S. Pat. No. 5,845,885, which is incorporated herein by reference. By example and without limitation, mounting structure 9 is provided as a plurality of mounting holes 11 projected from a bottom plane 13. Other mounting structures 9 are also contemplated and may be substituted without departing from the spirit and scope of the invention.

Docking station 5 includes an expansion module 15, for example, integrated with mounting structure 9. Expansion module 15 includes, for example, a power adaptor port 17 for connecting an external power supply and a data input/output (I/O) port 19 such as a Universal Serial Bus (USB) port or other data transfer port.

Figure 3:
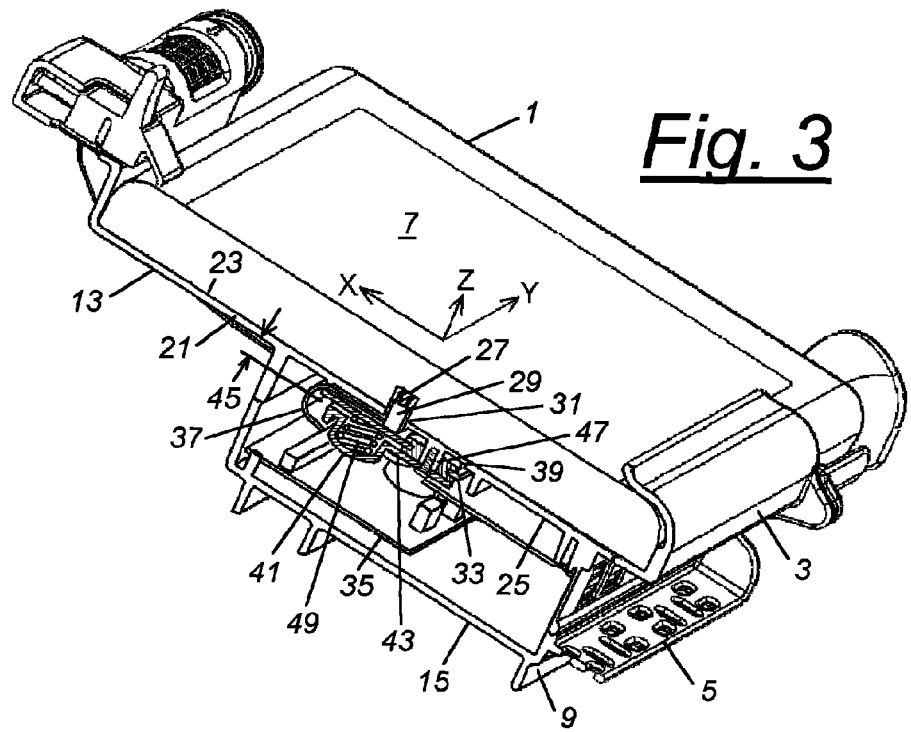
FIG. 3 and FIG. 4 are different views of the docking station of FIGS. 1 and 2, each showing a cross-sections of the expansion module.
Figure 4:
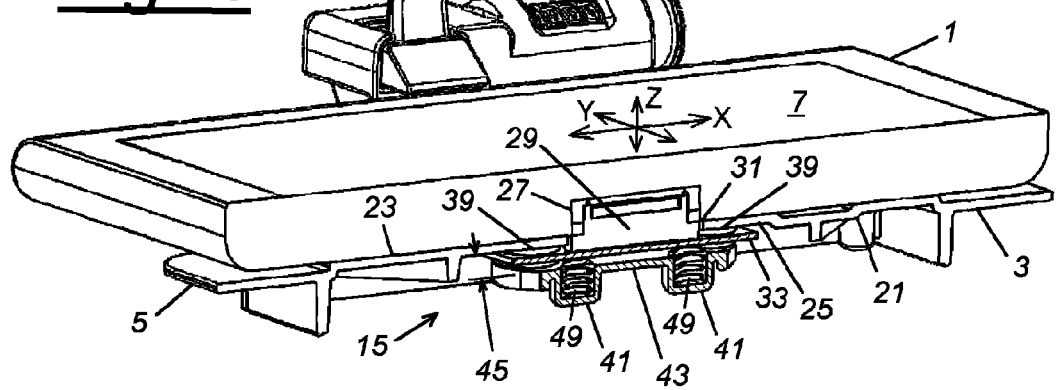

FIG. 3 and FIG. 4 are different cross-section views of docking station 5 wherein docking tray 3 is formed with a device bearing plate 21 having external bearing surface 23 where portable computing device 1 is seated, and an opposite interface surface 25 where expansion module 15 is mounted. Portable computing device 1 includes an expansion connector port 27 for function expansion. Expansion connector port 27 is structured to receive an electrical expansion connector 29 that is provided at bearing surface 23. For example, electrical expansion connector 29 is projected through an aperture 31 formed through bearing plate 21 between its external bearing surface 23 and opposing interface surface 25. Aperture 31 is sized to permit expansion connector 29 to move laterally in the plane of bearing plate 21 to reposition sufficiently to mate with expansion connector port 27 when portable computing device 1 is seated in docking tray 3.

Expansion connector 29 is fixedly mounted on a rigid connector carrier member 33 such as a printed circuit board (connector carrier PCB). Expansion module 15 may also include an expansion printed circuit board 35 (expansion PCB) in electrical communication with connector carrier member 33, or in direct communication with expansion connector 29, for example, through a flexible ribbon cable 37 extended therebetween.

Expansion module 15 includes a connector isolator system having both one or more in-plane isolators 39 that isolate against lateral motion in the X-Y plane of connector carrier member 33, and one or more out-of-plane Z-axis isolators 41 that isolate against out-of-plane motion along the Z-axis perpendicular to the X-Y plane, i.e., along the direction of insertion of expansion connector 29 into expansion connector port 27 of computing device 1. In-plane isolators 39 permit lateral motion in the X-Y plane of connector carrier member 33 within a limited range for mating expansion connector 29 with expansion connector port 27 of portable computing device 1. However, in-plane isolators 39 permit expansion connector 29 to remain in constant electrical connection with expansion connector port 27 only during application of lateral shock and vibration loads in the X-Y plane that cause responsive in-plane motion of computing device 1 within docking tray 3 such that communication is uninterrupted between computing device 1 and expansion PCB 35.

Unfortunately, in-plane isolators 39 only respond to lateral X-Y in-plane motion of connector carrier member 33 and expansion connector 29 fixedly mounted thereon. X-Y in-plane isolators 39 cannot respond to out-of-plane Z-axis motion of computing device 1 within docking tray 3. Rather, shock or vibration inputs that cause out-of-plane separation of computing device 1 from docking tray 3, even within a limited range, can also cause momentary separation of expansion connector 29 from expansion connector port 27 of portable computing device 1. Therefore, one or more out-of-plane Z-axis isolators 41 couple connector carrier member 33, which supports expansion connector 29, to bearing plate 21 of docking tray 3. By example and without limitation, out-of-plane Z-axis isolators 41 include a rigid backstop 43 that is spaced a fixed offset distance 45 away from an interface surface by a spacer 47. Connector carrier member 33, having one or more in-plane isolators 39, is movably positioned between backstop 43 and interface surface 25 of bearing plate 21 so as to be movable out-of-plane, i.e., along the Z-axis. One or more biasing members 49, by example and without limitation coil compression springs (shown), resiliently urge connector carrier member 33 out-of-plane along the Z-axis toward bearing plate 21 of docking tray 3, whereby expansion connector 29 is positively urged toward computing device 1 and into constant engagement with expansion connector port 27, even when shock or vibration inputs cause out-of-plane separation of computing device 1 from bearing plate 21 of docking tray 3.

Figure 5:
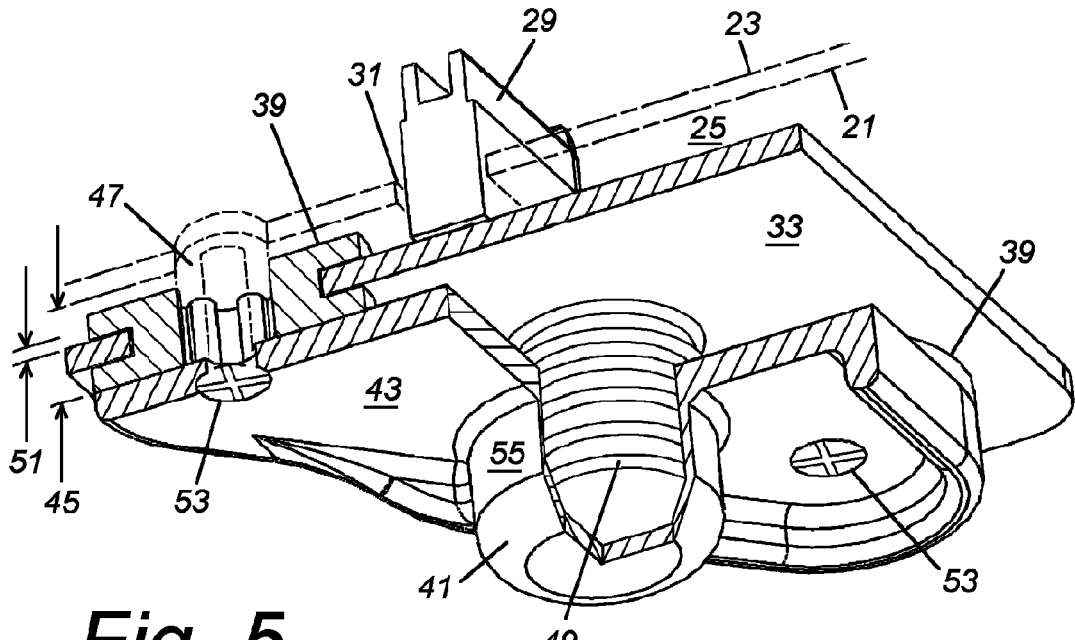
FIG. 5 and FIG. 6 show details of an out-of-plane Z-axis isolator of the invention.

FIG. 5 shows details of out-of-plane Z-axis isolators 41 wherein connector carrier member 33 is displaced along Z-axis away from interface surface 25 of bearing plate 21 (shown in phantom) toward backstop 43, as when portable computing device 1 is flush against bearing surface 23 of bearing plate 21. For example, connector carrier member 33 is movable within a constant engagement range 51 between backstop 43 and interface surface 25 of bearing plate 21. Constant engagement range 51 is sized to ensure constant engagement of electrical connector 29 with expansion connector port 27 of portable computing device 1 during out-of-plane Z-axis motion of computing device 1 within docking tray 3 due to normal shock or vibration inputs that cause out-of-plane separation of computing device 1 from docking tray 3. For example, constant engagement range 51 is, but not limited to, about 0.060 inch for the present application, wherein shock and vibration regimens result in out-of-plane separation of about 0.040 inch of computing device 1 from docking tray 3, whereby out-of-plane separation cannot exceed constant engagement range 51 of out-of-plane Z-axis isolators 41. According to one embodiment, connector carrier member 33 is coupled to bearing plate 21 of docking tray 3 by threaded fasteners or other retainers 53 joined to bearing plate 21 through spacers 47, and constant engagement range 51 is set by the length of spacers 47. When portable computing device 1 is seated on external bearing surface 23 of docking tray 3 with expansion connector port 27 mated with expansion connector 29 through aperture 31, biasing members 49 are compressed along Z-axis into respective sockets or other receivers 55 formed in backstop 43. Simultaneously, in-plane isolators 39 slide along length of respective spacers 47 for at least a portion of constant engagement range 51 or until bottoming out against backstop 43, and connector carrier member 33 is forced against expansion of biasing members 49 away from interface surface 25 of bearing plate 21.

Figure 6:
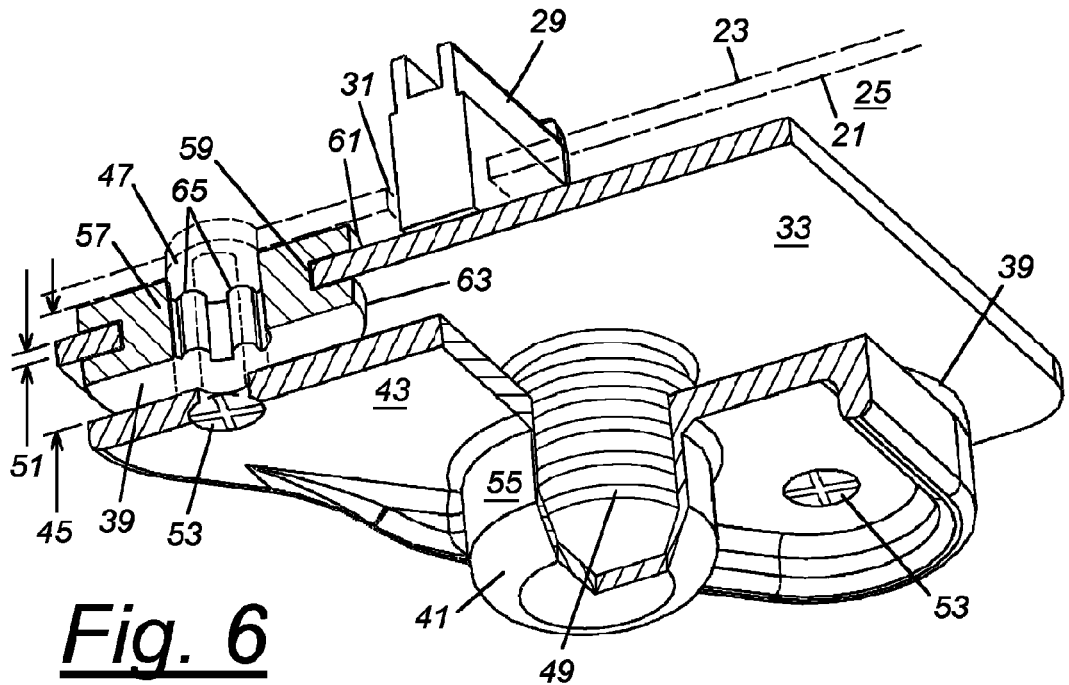

FIG. 6 shows details of out-of-plane Z-axis isolators 41 wherein connector carrier member 33 is displaced along Z-axis away from backstop 43 toward interface surface 25 bearing plate 21 (shown in phantom), as when shock or vibration inputs cause out-of-plane separation of computing device 1 away from bearing surface 23 of bearing plate 21. Here, biasing members 49 are expanded along Z-axis between backstop 43 and interface surface 25 of bearing plate 21. Simultaneously, in-plane isolators 39 slide along length of respective spacers 47 for at least a portion of constant engagement range 51 or until bottoming out against interface surface 25 of bearing plate 21, and connector carrier member 33 is forced by expansion of biasing members 49 away from backstop 43 and toward interface surface 25 of bearing plate 21. Accordingly, expansion connector 29 is projected through aperture 31 to remain in mated connection with expansion connector port 27 of computing device 1.

Here, in-plane isolators 39 are elastomeric bushings having a central tube 57 fit through an aperture 59 through connector carrier member 33, and upper and lower flanges or lips 61, 63 positioned on opposites of connector carrier member 33. A plurality of elastomeric isolation spokes 65 are projected radially inwardly of central tube 57. Spacers 47 are slidingly received through isolator tube 57 between isolation spokes 65. During initial seating of computing device 1, isolation spokes 65 bend radially under lateral X-Y in-plane pressure of spacers 47 to lateral X-Y in-plane motion of connector carrier member 33 to accommodate mating of expansion connector 29 with expansion connector port 27 of portable computing device 1. When docking station 5 is subjected to lateral shock and vibration loads in the X-Y plane, isolation spokes 65 bend radially to permit limited lateral X-Y in-plane motion of connector carrier member 33 to maintain constant lateral engagement of expansion connector 29 with expansion connector port 27. However, as disclosed herein, X-Y in-plane isolators 39 cannot respond to out-of-plane Z-axis motion of computing device 1 within docking tray 3, such that shock and/or vibration inputs having an out-of-plane Z-axis component potentially interrupt communication between expansion PCB 35 and computing device 1.

Figure 7:
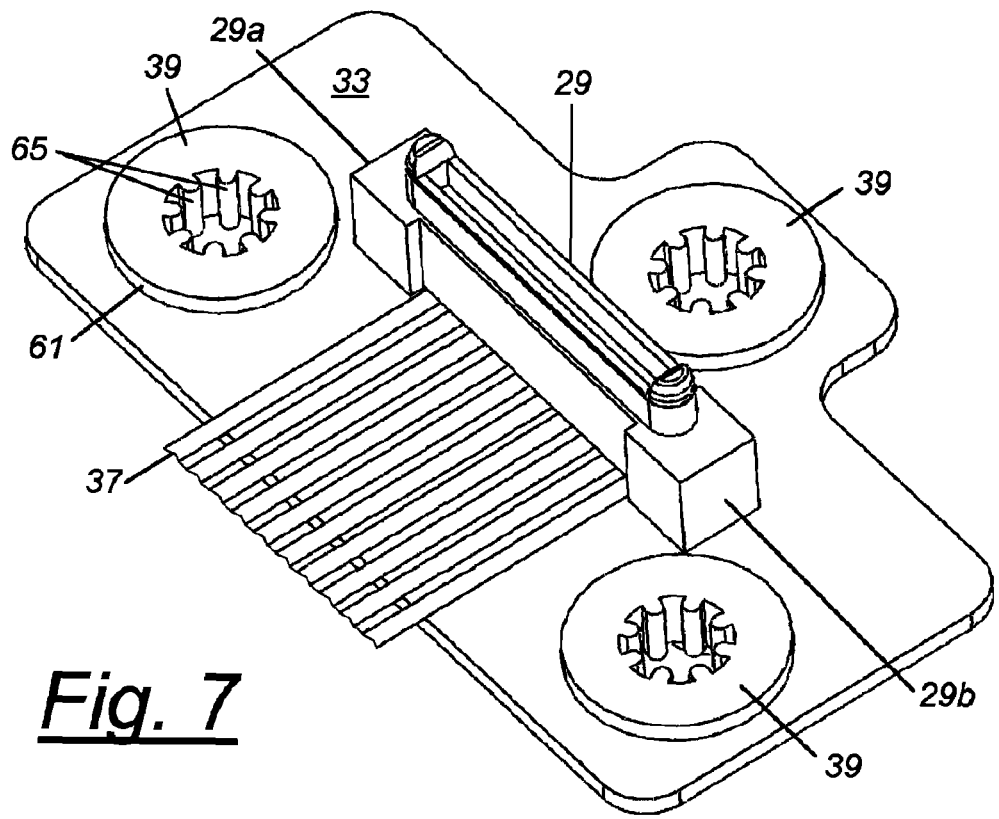
FIG. 7 shows an expansion connector mounted on a PCB or other connector carrier member with three in-plane isolators.

FIG. 7 shows expansion connector 29 mounted on connector carrier member 33 with in-plane isolators 39.

Figure 8:
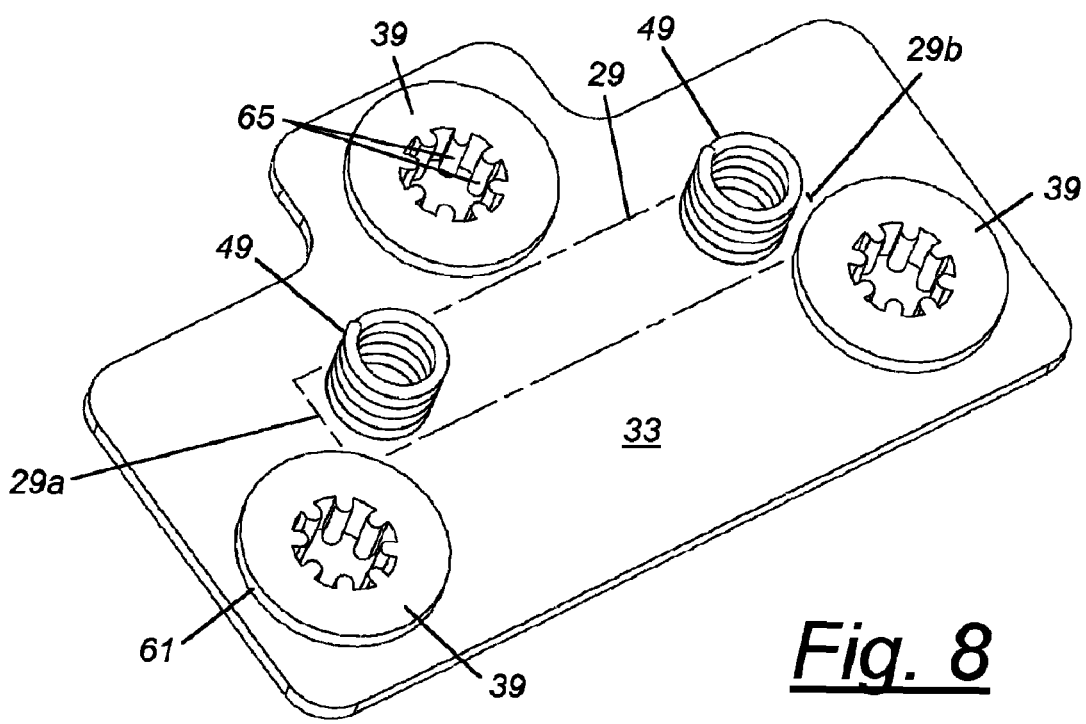
FIG. 8 shows an opposite side of the connector carrier member from FIG. 7.

FIG. 8 shows connector carrier member 33 opposite from expansion connector 29 and having in-plane isolators 39 with footprint of expansion connector 29 (shown in phantom). Biasing members 49 of two or more out-of-plane Z-axis isolators 41 are positioned on connector carrier 33 between a triangular plurality of X-Y in-plane lateral shock and vibration isolators 39. For example, as shown here, biasing members 49 are positioned opposite from expansion connector 29, and substantially aligned with end portions 29a, 29b thereof (shown in FIG. 7).

Figure 9:
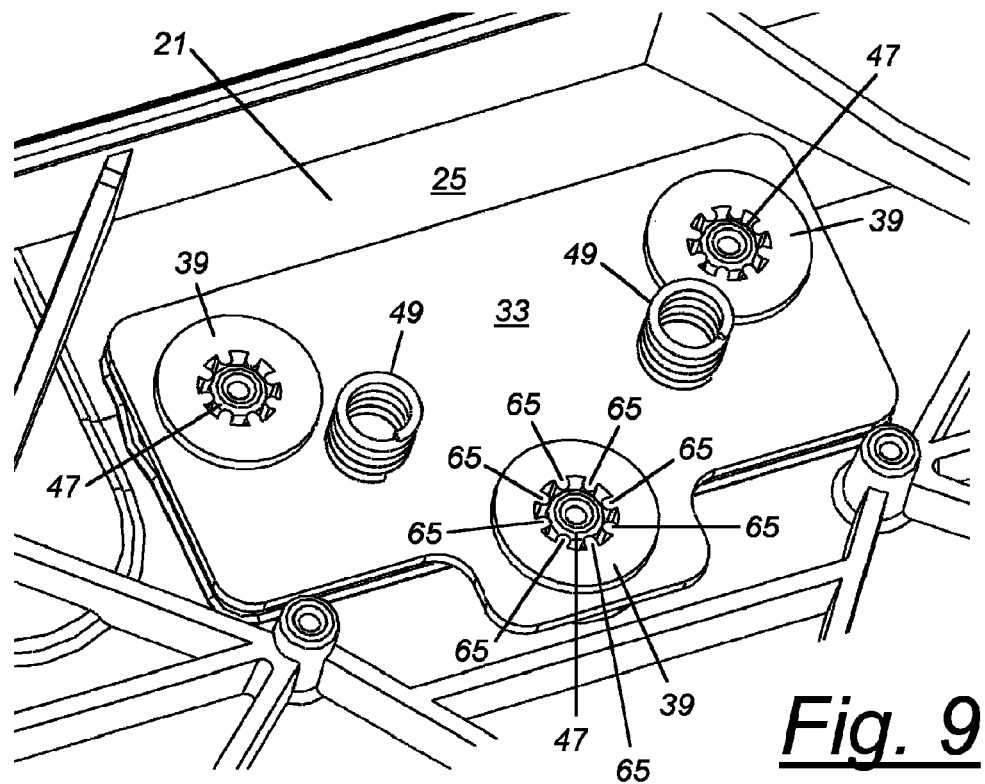
FIG. 9 illustrates the connector carrier positioned on a bearing plate of the docking tray.

FIG. 9 illustrates connector carrier member 33 positioned on bearing plate 21 of docking tray 3 with X-Y in-plane lateral shock and vibration isolators 39 slidingly installed over a triangular arrangement of spacers 47 projected from interface surface 25 of bearing plate 21. Connector carrier member 33 is thus slidingly suspended between backstop 43 and interface surface 25 of bearing plate 21. Accordingly, connector carrier member 33 is slidably movable out-of-plane, i.e., along the Z-axis, by lateral shock and vibration isolators 39 sliding along respective spacers 47. Backstop 43 is shown removed here to show biasing members 49.

Figure 10:
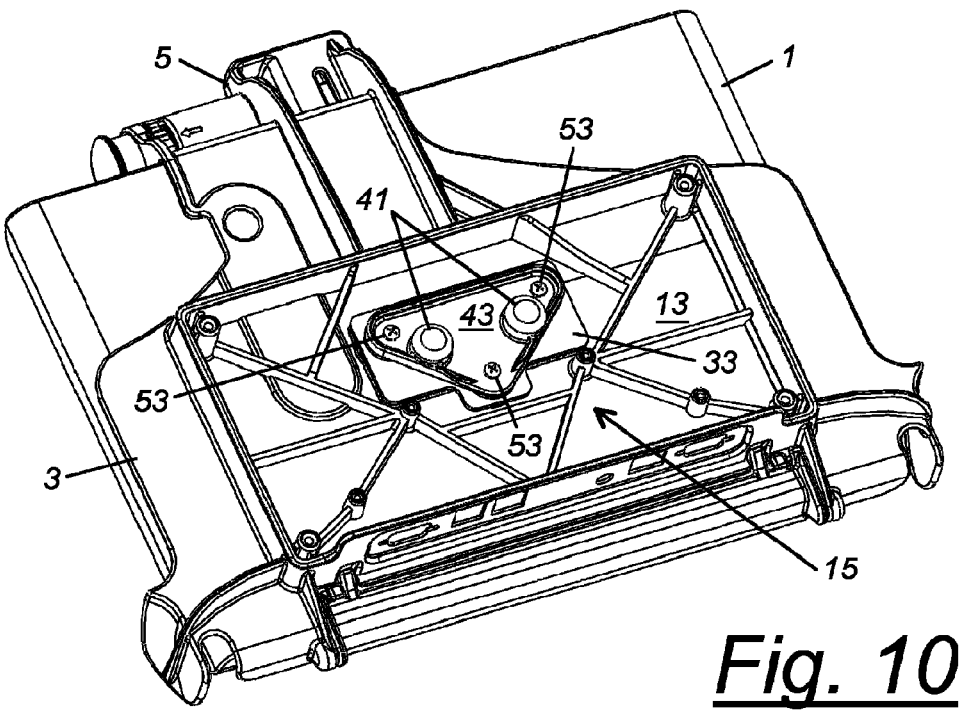
FIG. 10 illustrates the connector carrier member sandwiched between an interface surface of the bearing plate and a rigid backstop.

FIG. 10 illustrates connector carrier member 33 sandwiched between interface surface 25 of bearing plate 21 and backstop 43. As disclosed herein, biasing members 49 are captured between connector carrier member 33 and backstop 43 for resiliently urging connector carrier member 33 out-of-plane along the Z-axis toward bearing plate 21 of docking tray 3.

FIG. 11 and FIG. 12 both illustrate connector carrier member 33 operated in combination with out-of-plane Z-axis isolators 41. In both FIG. 11 and FIG. 12, portable computing device 1 is positioned on bearing plate 21 of docking tray 3. Furthermore, expansion connector 29 is constantly mated with expansion connector port 27 of portable computing device 1.

In FIG. 11, portable computing device 1 is seated substantially flush against external bearing surface 23 of bearing plate 21. Accordingly, expansion connector port 27 of computing device 1 is positioned adjacent to aperture 31 in bearing plate 21. Connector carrier member 33 is displaced away from bearing plate 21 and toward spaced-away backstop 43 by mating of expansion connector 29 with expansion connector port 27 of portable computing device 1. When computing device 1 is seated substantially flush against external bearing surface 23 of bearing plate 21, displacement of connector carrier member 33 toward backstop 43 compresses biasing members 49 into sockets 55 or otherwise against backstop 43, while retainers 53 fix backstop 43 against spacers 47 of out-of-plane Z-axis isolators 41 at fixed offset distance 45 from bearing plate 21. Connector carrier member 33 is thus under constant pressure of compressed biasing members 49 to push expansion connector 29 into mating contact with expansion connector port 27 of portable computing device 1.

In FIG. 12, portable computing device 1 is lifted away from external bearing surface 23 of bearing plate 21, as by application of shock and/or vibration inputs having an out-of-plane Z-axis component. In response to portable computing device 1 being lifted away from external bearing surface 23 of bearing plate 21, out-of-plane Z-axis isolators 41 automatically operate to responsively urge expansion connector 29 into mating contact with expansion connector port 27 of portable computing device 1.

Here, compressed biasing members 49 automatically operate between bearing plate 21 and backstop 43 by expanding to displace connector carrier member 33 along spacers 47 toward interface surface 25 of bearing plate 21. Expanding biasing members 49 in turn pushes expansion connector 29 into maintaining constant mating contact with expansion connector port 27 of portable computing device 1. Therefore, out-of-plane Z-axis isolators 41 automatically maintain expansion connector 29 in maintaining constant mating contact with expansion connector port 27 of portable computing device 1 within constant engagement range 51 of connector carrier member 33, as disclosed herein.

Alternative Embodiment

Figure 15:
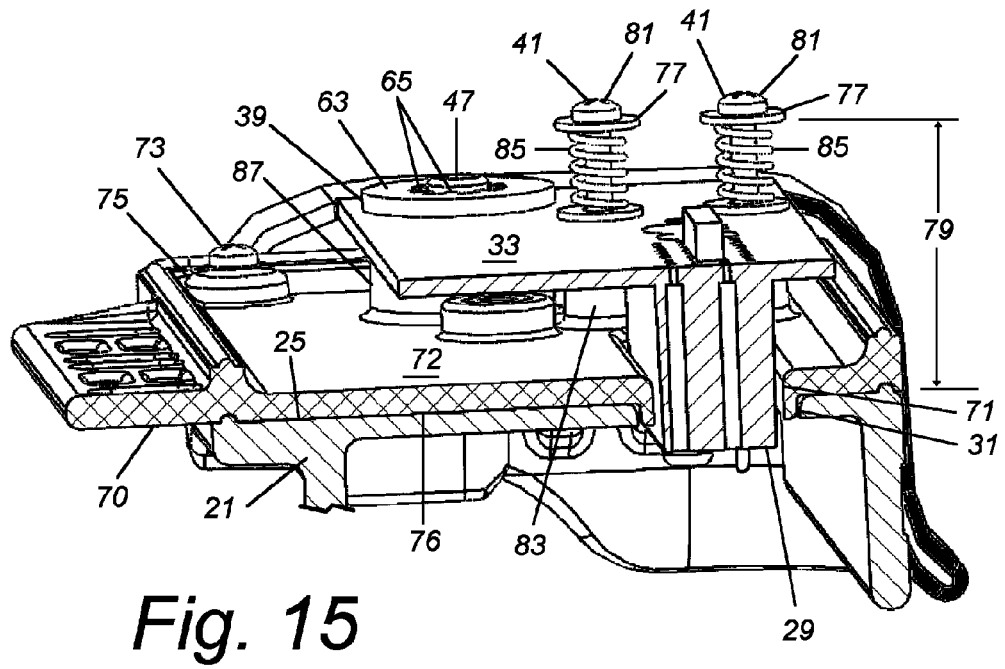
Figure 16:
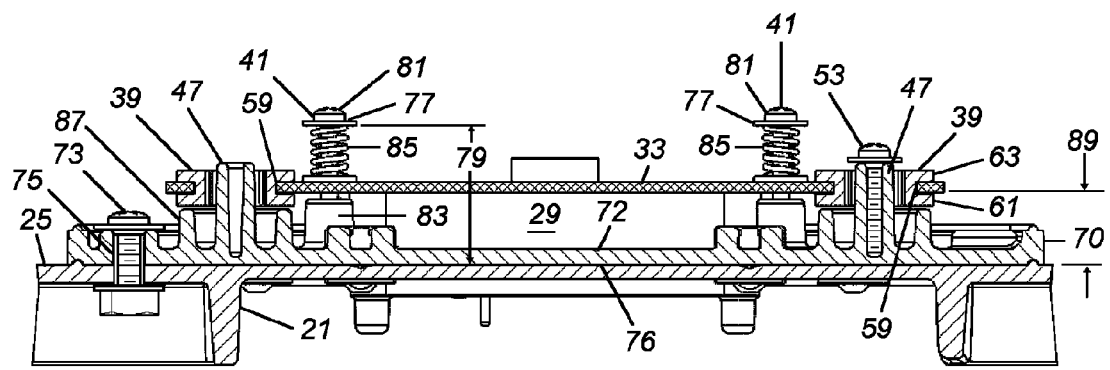

FIGS. 13-16 all illustrate a single alternative embodiment of the connector isolator system of the invention, wherein FIG. 13 is a top pictorial view of the alternative embodiment of the connector isolator system, FIG. 14 is a front elevation view of the alternative embodiment of the connector carrier member shown in FIG. 13, FIG. 15 is a side cross-section view thereof, and FIG. 16 is a front cross-section view thereof.

According to this alternative embodiment of the connector isolator system of the invention, expansion connector 29 is fixedly mounted on rigid connector carrier member 33 such as a printed circuit board (connector carrier PCB). Expansion module 15 may also include expansion printed circuit board 35 (expansion PCB) in electrical communication with connector carrier member 33, shown for example in FIG. 3. Connector carrier member 33 is moveably coupled to a mounting plate 70 with expansion connector 29 projected through an aperture 71 (shown in FIG. 15) formed through mounting plate 70 between its external contact surface 76 and opposing operational surface 72. For example, one or more in-plane X-Y isolators 39 and one or more out-of-plane Z-axis isolators 41 combine to suspend connector carrier member 33 above an operational surface 72 of mounting plate 70. In operation, expansion connector 29 is insert into expansion connector port 27 of computing device 1, as disclosed herein. Thereafter, mounting plate 70 is attached to interface surface 25 of device bearing plate 21 opposite of external bearing surface 23 where portable computing device 1 is seated, shown for example in FIGS. 3 and 4. For example, fasteners 73 are mounted through a plurality of apertures 75 for coupling a contact surface 76 of mounting plate 70 to interface surface 25 of device bearing plate 21, as shown for example in FIG. 16.

Here, the connector isolator system includes one or more in-plane X-Y isolators 39 that isolate against lateral motion in the X-Y plane of connector carrier member 33, and one or more out-of-plane Z-axis isolators 41 that isolate against out-of-plane motion along the Z-axis perpendicular to the X-Y plane, i.e., along the direction of insertion of expansion connector 29 into expansion connector port 27 of computing device 1. Here, also in-plane isolators 39 permit lateral motion in the X-Y plane of connector carrier member 33 within a limited range for mating expansion connector 29 with expansion connector port 27 of portable computing device 1. However, in-plane isolators 39 permit expansion connector 29 to remain in constant electrical connection with expansion connector port 27 only during application of lateral shock and vibration loads in the X-Y plane that cause responsive in-plane motion of computing device 1 within docking tray 3 such that uninterrupted communication is maintained between computing device 1 and expansion PCB 35.

As disclosed herein, in-plane isolators 39 unfortunately only respond to lateral X-Y in-plane motion of connector carrier member 33 and expansion connector 29 fixedly mounted thereon. X-Y in-plane isolators 39 cannot respond to out-of-plane Z-axis motion of computing device 1 within docking tray 3. Rather, shock or vibration inputs that cause out-of-plane separation of computing device 1 from docking tray 3, even within a limited range, can also cause momentary separation of expansion connector 29 from expansion connector port 27 of portable computing device 1. Therefore, one or more out-of-plane Z-axis isolators 41 couple connector carrier member 33, which supports expansion connector 29, to bearing plate 21 of docking tray 3. By example and without limitation, out-of-plane Z-axis isolators 41 each include a rigid backstop 77 that is spaced a maximum offset distance 79 away from contact surface 76 of mounting plate 70, and in operation interface surface 25 of device bearing plate 21, by a spacer post 81. For example, spacer posts 81 is a shoulder screw threaded into a boss 83 formed on operational surface 72 of mounting plate 70, whereby maximum offset distance 79 spacing of backstop 77 away from contact surface 76 is adjustable by threading screw-type spacer posts 81 into or out of boss 83. Connector carrier member 33 is movably positioned by one or more in-plane isolators 39 between backstop 77 and operational surface 72 of mounting plate 70 so as to be movable out-of-plane, i.e., along the Z-axis. One or more biasing members 85, by example and without limitation coil compression springs (shown), is positioned between connector carrier member 33 and backstops 77 for resiliently urge connector carrier member 33 out-of-plane along the Z-axis toward bearing plate 21 of docking tray 3, whereby expansion connector 29 is positively urged toward computing device 1 and into constant engagement with expansion connector port 27, even when shock or vibration inputs cause out-of-plane separation of computing device 1 from bearing plate 21 of docking tray 3.

FIG. 13 shows a plurality of out-of-plane Z-axis isolators 41 positioned surrounding and balancing expansion connector 29. For example, four out-of-plane Z-axis isolators 41 are illustrated at the four corners of expansion connector 29. Alternatively, three out-of-plane Z-axis isolators 41 are positioned in a triangular pattern balancing expansion connector 29.

FIG. 13 also shows two of in-plane isolators 39 positioned adjacent to opposite ends of expansion connector 29. Alternatively, three X-Y in-plane lateral shock and vibration isolators 39 are positioned in a triangular arrangement around expansion connector 29, as disclosed in FIG. 8.

Spacer hubs 87 around the base of in-plane isolators 39 support connector carrier member 33 a fixed minimum offset distance 89 away from contact surface 76 of mounting plate 70.

In-plane isolators 39 are each slidably supported on spacers 47 which, by example and without limitation, are configured as guide posts that are extended from the center of one of spacer hubs 87. However, this arrangement of guide posts 47 with spacer hubs 87 is only for convenience of manufacture and is not critical to the practice of the invention.

As disclosed herein, in-plane isolators 39 are elastomeric bushings having a central tube 57 fit through an aperture 59 through connector carrier member 33, and upper and lower flanges or lips 61, 63 positioned on opposites of connector carrier member 33. A plurality of elastomeric isolation spokes 65 are projected radially inwardly of central tube 57. Guide posts 47 are slidingly received through isolator tube 57 between isolation spokes 65. During initial seating of computing device 1, isolation spokes 65 bend radially under lateral X-Y in-plane pressure of guide posts 47 to lateral X-Y in-plane motion of connector carrier member 33 to accommodate mating of expansion connector 29 with expansion connector port 27 of portable computing device 1. When docking station 5 is subjected to lateral shock and vibration loads in the X-Y plane, isolation spokes 65 bend radially against guide posts 47 to permit limited lateral X-Y in-plane motion of connector carrier member 33 for maintaining constant lateral engagement of expansion connector 29 with expansion connector port 27.

As disclosed herein, connector carrier member 33 is coupled to mounting plate 70 by guide posts 47, and is movable within constant engagement range 51 is the distance between maximum and minimum offset distances 79, 89 relative to contact surface 76 of mounting plate 70 as set by rigid backstops 77 and spacer hubs 87, respectively. When portable computing device 1 is seated on external bearing surface 23 of docking tray 3 with expansion connector port 27 mated with expansion connector 29 through aperture 31, biasing members 85 are compressed along Z-axis about respective spacer posts 81 extended from operational surface 72 of mounting plate 70. Simultaneously, in-plane isolators 39 slide along length of respective guide posts 47 for at least a portion of constant engagement range 51 or until bottoming out against backstops 77, and connector carrier member 33 is forced against expansion of biasing members 85 away from contact surface 76 of mounting plate 70 and interface surface 25 of bearing plate 21.

Optionally, constant engagement range 51 is adjustable by adjusting maximum offset distance 79 spacing of backstop 77 away from contact surface 76, as disclosed herein.

As illustrated in FIG. 16 (right side) connector carrier member 33 is optionally coupled to bearing plate 21 of docking tray 3 by threaded fasteners or other retainers 53 joined to mounting plate 70 through guide posts 47, and constant engagement range 51 is set by the length of guide posts 47. However, retainers 53 are optional and are not critical to the practice of the invention at least because coil spring biasing members 85 react against backstops 77 to urge connector carrier member 33 out-of-plane along the Z-axis toward operational surface 72 of mounting plate 70. Furthermore, reaction of biasing member 85 against backstops 77 effectively prevents overtravel of in-plane isolators 39 along guide posts 47 and disengagement of in-plane isolators 39 from guide posts 47. Additionally, the length of guide posts 47 can be adjusted to cooperate with a given biasing member 85 in combination with a given offset distance 79 of rigid backstop 77 away from contact surface 76 of mounting plate 70 to insure continuous engagement of in-plane isolators 39 with guide posts 47. Also, when spacer posts 81 is a shoulder screw threaded into a boss 83 formed on operational surface 72 of mounting plate 70, offset distance 79 of rigid backstop 77 away from contact surface 76 of mounting plate 70 is adjustable by advancing shoulder screw-type spacer posts 81 into engagement with mounting plate 70 thereby decreasing offset distance 79 or, in the alternative, backing shoulder screw-type spacer posts 81 away from engagement with mounting plate 70 thereby increasing offset distance 79.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A connector isolator system, comprising:
a mounting plate comprising a contact surface and an operational surface substantially opposite thereof;
a backstop spaced a distance away from the operational surface of the mounting plate;
a connector carrier member that is movable out-of-plane between the backstop and the operational surface of the mounting plate, and further comprises one or more in-plane isolators;
an electrical connector mounted on the connector carrier member in a position to pass through an aperture in the mounting plate; and
one or more biasing members arranged between the backstop and the connector carrier member for urging the connector carrier member toward the mounting plate.

2. The connector isolator system of claim 1, wherein connector carrier member that is movable out-of-plane between the backstop and the operational surface of the mounting plate within an engagement range wherein the one or more in-plane isolators remains in substantially constant engagement with a respective guide post.

3. The connector isolator system of claim 2, wherein the engagement range is adjustable by adjusting the distance the backstop is spaced away from the contact surface of the mounting plate.

4. The connector isolator system of claim 3, wherein the connector carrier member is movable within a fixed distance between the backstop and the operational surface of the mounting plate.

5. The connector isolator system of claim 4, wherein the one or more biasing members further comprises one or more compression springs.

6. The connector isolator system of claim 4, wherein the one or more in-plane isolators are further slidable along the respective guide post.

7. The connector isolator system of claim 6, wherein the one or more in-plane isolators further comprises an elastomeric bushing comprising a plurality of elastomeric radially projected isolation spokes spaced to sliding receive therein a respective one of the guide posts.

8. The connector isolator system of claim 1, further comprising:
a docking tray comprising a device bearing plate formed with an external bearing surface and an interface surface opposite therefrom with an aperture therebetween and sized for accommodating an electrical connector;
an expansion module, comprising: the mounting plate of the connector isolator system, the backstop thereof, the connector carrier member thereof with the one or more in-plane isolators, the electrical connector mounted thereof on the connector carrier member, and the one or more biasing members thereof arranged between the backstop and the connector carrier member for urging the connector carrier member toward the mounting plate; and
means for coupling the expansion module to the docking tray with the contact surface of the mounting plate in a position adjacent to the interface surface of the device bearing plate and with the electrical connector positioned for passing through the aperture therein.

9. A connector isolator system, comprising:
a mounting plate comprising a contact surface and an operational surface substantially opposite therefrom with an aperture therebetween sized for accommodating an electrical connector;
a connector carrier member positionable adjacent to the operational surface of the mounting plate and further comprising one or more in-plane isolators;
an electrical connector mounted adjacent to a first surface of the connector carrier member in a position to pass through the aperture in the mounting plate when the connector carrier member is further positioned adjacent to the operational surface of the mounting plate;
a backstop positioned adjacent to a second surface of the connector carrier member opposite from the first surface thereof having the electrical connector adjacent thereto, the connector carrier member backstop being spaced an offset distance away from the operational surface of the mounting plate that is greater than a thickness of the connector carrier member, with the connector carrier member being movably suspended between the backstop and the operational surface of the mounting plate;
means for positioning the backstop spaced the offset distance away from the operational surface of the mounting plate; and
one or more biasing members arranged between the second surface of the connector carrier member and the backstop for urging the connector carrier member away from the backstop and through the aperture in the mounting plate.

10. The connector isolator system of claim 9, wherein the one or more in-plane isolators further comprises a bushing that is slidable along a respective guide post.

11. The connector isolator system of claim 10, wherein the bushing of the in-plane isolators further comprises an elastomeric bushing comprising a central tube positioned within an aperture through the connector carrier member, the elastomeric bushing further comprising a plurality of isolator spokes projecting inwardly of the central tube thereof to slidingly receive therethrough the respective guide post.

12. The connector isolator system of claim 9, wherein the connector carrier member is movable within an engagement distance between the backstop and the operational surface of the mounting plate.

13. The connector isolator system of claim 12, wherein the engagement distance between the backstop and the operational surface of the mounting plate further comprises an adjustable engagement distance.

14. The connector isolator system of claim 9, wherein the biasing member further comprises a compression spring.

15. The connector isolator system of claim 9, further comprising a plurality of the in-plane isolators.

16. The connector isolator system of claim 9, wherein the connector carrier member further comprises a printed circuit board.

17. The connector isolator system of claim 9, further comprising:
a docking tray comprising a device bearing plate formed with an external bearing surface and an interface surface opposite therefrom with an aperture therebetween and sized for accommodating an electrical connector;

an expansion module, comprising: the mounting plate of the connector isolator system, the connector carrier member thereof with the one or more in-plane isolators, the electrical connector mounted thereof on the connector carrier member, the backstop thereof, the backstop positioning means, and the one or more biasing members thereof arranged between the connector carrier member and the backstop for urging the connector carrier member through the aperture in the mounting plate; and means for coupling the expansion module to the docking tray with the contact surface of the mounting plate in a position adjacent to the interface surface of the device bearing plate and with the electrical connector positioned for passing through the aperture therein.

18. A connector isolator system, comprising:

a substantially rigid mounting plate comprising a contact surface and an operational surface substantially opposite therefrom with an aperture extended therebetween and sized for passing an electrical connector therethrough, the mounting plate further comprising a plurality of guide posts protruded from the operational surface thereof;

a connector carrier member comprising a printed circuit board with a plurality of in-plane isolators positioned within respective apertures through the printed circuit board and slidingly engaged with a respective one of the guide posts protruded from the operational surface of the mounting plate, and further comprising an electrical connector mounted on a first surface thereof facing toward the mounting plate in a position to pass through the aperture therein;

a plurality of backstops spaced away an offset distance from the operational surface of the mounting plate with the connector carrier member positioned therebetween, the offset distance between the backstops and the operational surface of the mounting plate being greater than a thickness of the printed circuit board of the connector carrier member, with the connector carrier member being movable over at least a portion of the offset distance between the backstops and the operational surface of the mounting plate;

a plurality of biasing members arranged between the second surface of the printed circuit board of the connector carrier member and one or more of the backstops for urging the connector carrier member toward the operational surface of the mounting plate and urging the electrical connector to pass through the aperture therein;

a docking tray comprising a device bearing plate formed with an external bearing surface and an interface surface opposite therefrom with an aperture extended therebetween and sized for accommodating the electrical connector; and means for coupling the mounting plate to the docking tray with the contact surface thereof in a position adjacent to the interface surface of the device bearing plate of the docking tray and having the electrical connector positioned to pass through the aperture therein.

19. The connector isolator system of claim 18, wherein each of the plurality of in-plane isolators further comprises an elastomeric bushing comprising upper and lower lips positioned on opposites of the printed circuit board of the connector carrier member with a central tube therebetween within the aperture through the connector carrier member, the elastomeric bushing further comprising a plurality of isolator spokes projecting inwardly of the central tube thereof spaced to slidingly receive therethrough a respective one of the guide posts protruded from the operational surface of the mounting plate.

20. The connector isolator system of claim 19, wherein the offset distance between the backstops and the operational surface of the mounting plate is further adjustable.

* * * * *